(12) United States Patent
An et al.

(10) Patent No.: US 12,151,367 B2
(45) Date of Patent: Nov. 26, 2024

(54) GRIPPER AND ROBOT

(71) Applicants: SHANGHAI FLEXIV ROBOTICS TECHNOLOGY CO., LTD., Shanghai (CN); FLEXIV LTD., Grand Cayman (GB)

(72) Inventors: Ran An, Santa Clara, CA (US); Tingke Song, Shanghai (CN); Juncai Peng, Shanghai (CN)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 466 days.

(21) Appl. No.: 17/610,064

(22) PCT Filed: Oct. 16, 2020

(86) PCT No.: PCT/CN2020/121469
§ 371 (c)(1),
(2) Date: Nov. 9, 2021

(87) PCT Pub. No.: WO2022/077431
PCT Pub. Date: Apr. 21, 2022

(65) Prior Publication Data
US 2022/0305675 A1    Sep. 29, 2022

(51) Int. Cl.
    *B25J 15/08*    (2006.01)
(52) U.S. Cl.
    CPC ..................... *B25J 15/08* (2013.01)
(58) Field of Classification Search
    CPC .... B25J 15/08; B25J 15/0033; B25J 15/0293; B25J 9/14; B25J 15/0475; B25J 15/0408
    USPC ................................................ 294/86.4, 213
    See application file for complete search history.

(56) References Cited

U.S. PATENT DOCUMENTS

| 3,901,547 | A | * | 8/1975 | Skinner, II | ............. | B25J 15/103 |
|           |   |   |        |             |               | 623/64 |
| 5,150,937 | A | * | 9/1992 | Yakou | ..................... | B25J 15/103 |
|           |   |   |        |       |                     | 294/907 |
| 2019/0077028 | A1 | | 3/2019 | Golan et al. | | |

FOREIGN PATENT DOCUMENTS

| CN | 107081783 A | 8/2017 |
| CN | 108890683 A | 11/2018 |
| CN | 109500807 A | 3/2019 |
| CN | 210939332 U | 7/2020 |

(Continued)

OTHER PUBLICATIONS

International Search Report from International Application No. PCT/CN2020/121469 mailed Jul. 15, 2021.

*Primary Examiner* — Paul T Chin
(74) *Attorney, Agent, or Firm* — Dorsey & Whitney LLP (57) ABSTRACT

The present disclosure relates to a gripper and a robot. The gripper according to the present disclosure includes at least three guiding rails arranged head to tail in sequence, at least three gripping fingers respectively disposed on the at least three guiding rails and a driving mechanism. A first end of each of the gripping fingers is slidably connected to the corresponding guiding rail and a second end of each of the gripping fingers is for contacting the object to be gripped. The driving mechanism drives each of the gripping fingers to move along the corresponding guiding rail, so that the second end of each of the gripping fingers moves toward or away from a gripping center of the gripper.

14 Claims, 5 Drawing Sheets

(56) References Cited

FOREIGN PATENT DOCUMENTS

| | | | | |
|---|---|---|---|---|
| JP | H0947994 | * | 2/1997 | .............. B25J 15/08 |
| JP | H0947994 A | | 2/1997 | |

* cited by examiner

GRIPPER AND ROBOT

CROSS REFERENCE TO RELATED APPLICATIONS

The application is a U.S. National Stage of PCT International Application No. PCT/CN2020/121469, filed on Oct. 16, 2020, the content of which is incorporated herein by reference in its entirety.

TECHNICAL FIELD

The present disclosure relates to a gripper and a robot.

BACKGROUND

In the field of mechanical machining, the positioning and position adjustment of a workpiece being processed are usually carried out by means of a robotic arm equipped with a gripper. Three-jaw grippers are broadly used in the working environment of grasping complex objects. At present, three-jaw grippers mainly include grippers based on pinching movement and grippers based on linear movement.

The typical structures of the grippers based on the pinching movement include a fixing seat provided with three grooves extending radially toward the center of the fixing seat and evenly arranged in a circumferential direction of the fixing seat, and three gripping fingers are respectively arranged in the three grooves. Each of the gripping fingers can rotate in the corresponding groove, so that the ends of the gripping fingers are moved toward or away from a center line of the fixing seat. A complex structure for driving the gripping fingers to rotate is usually disposed inside a center portion of the fixing seat, and therefore, a radial length of each of the grooves is much smaller than a radius of the fixing seat. In this implementation, a rotatable angle provided by each of the grooves for each of the gripping fingers is relatively small and a travel distance of each of the gripping fingers is also relatively small. As a result, the stroke of the grippers for gripping objects is limited, and the versatility of the grippers is limited.

A typical structure of the grippers based on linear movement includes a chuck provided with three tracks extending radially toward the center of the chuck and evenly arranged in a circumferential direction of the chuck, and three gripping fingers are respectively arranged in the three tracks. Each of the gripping fingers can move linearly in the corresponding track to be moved toward or away from the center of the chuck. A complex structure for driving the gripping fingers to move is disposed inside a center portion of the chuck, and therefore, a radial length of each of the tracks is much smaller than a radius of the chuck. In this implementation, a travel distance of each of the gripping fingers is relatively small. As a result, the stroke of the grippers for gripping objects is limited, and the versatility of the grippers is limited.

SUMMARY

The present disclosure aims to provide a gripper with an increased gripping size range. The present disclosure also provides a robot.

One aspect of the present disclosure provides a gripper that includes at least three guiding rails arranged head to tail in sequence; at least three gripping fingers respectively disposed on the at least three guiding rails, each of the gripping fingers comprising a first end slidably connected to a corresponding one of the at least three guiding rails and a second end configured to contact an object to be gripped; and a driving mechanism configured to drive each of the gripping fingers to move along the corresponding one of the at least three guiding rails, so that the second end of each of the gripping fingers moves toward or away from a gripping center of the gripper.

Another aspect of the present disclosure provides a robot that includes the above-mentioned gripper. The robot can also achieve the technical effects of the above-mentioned gripper.

DETAILED DESCRIPTION

Referring to FIGS. 1-5, a gripper according to some embodiments of the present disclosure is shown. As shown, the gripper includes three guiding rails (a first guiding rail 11, a second guiding rail 21 and a third guiding rail 31), three gripping fingers (a first gripping finger 4, a second gripping finger 5, and a third gripping finger 6), and a driving mechanism 7. The three guiding rails are arranged head to tail in sequence, for example, they are arranged in a manner of sequentially facing one another end to end. For example, the three guiding rails may be respectively located at the three sides of a virtual first regular triangle ABC. The three gripping fingers are respectively disposed on the three guiding rails, a first end of each of the gripping fingers is slidably connected to a corresponding one of the at least three guiding rails, and a second end of each of the gripping fingers is used for contacting an object to be gripped. The driving mechanism is used for driving each of the gripping fingers to move along the corresponding guiding rail, so that the second end of each of the gripping fingers moves toward or away from a gripping center of the gripper to grip or release the object.

In this embodiment, the gripping center corresponds to a center O of the first regular triangle ABC, and the driving mechanism drives each of the gripping fingers to move along the corresponding guiding rail between a first end and a second end of the corresponding guiding rail, so that the second end of each of the gripping fingers moves away from or toward the gripping center of the gripper, thereby allowing the gripper to be changed between an open state and a closed state. In some embodiments, the driving mechanism 7 can drive the gripping fingers to move synchronously. In other embodiments, the driving mechanism 7 can drive the gripping fingers to move asynchronously. It can be understood that when the gripper is in the open state, gripping portions of the three gripping fingers are separated and provide a maximum gripping size, and when the gripper is in the closed state, the gripping portions of the three gripping fingers gather together and provide a minimum gripping size. In some embodiments, the minimum gripping size may be close to zero, while the gripping portions of the gripping fingers are substantially abutting against each other.

The embodiments of the present disclosure are described in detail below. In some embodiments, the three guiding rails are the first guiding rail 11, the second guiding rail 21, and the third guiding rail 31 that are arranged head to tail. A first end 111 of the first guiding rail 11 is close to a second end 312 of the third guiding rail 31, a second end 112 of the first guiding rail 11 is close to a first end 211 of the second guiding rail 21, and a second end 212 of the second guiding rail 21 is close to a first end 311 of the third guiding rail 31. The first rail 11, the second rail 21, and the third rail 31 can be respectively disposed at the three sides of the virtual first regular triangle ABC. In other words, a geometric shape defined by the first guiding rail 11, the second guiding rail 21, and the third guiding rail 31 is a regular triangle. In this embodiment, the three guiding rails each may be a linear guiding rail. In other embodiments, the three guiding rails each may be a curved guiding rail. In this case, an approximate regular triangle defined by three curved guiding rails is also within the protection scope of the present disclosure.

Figure 1:
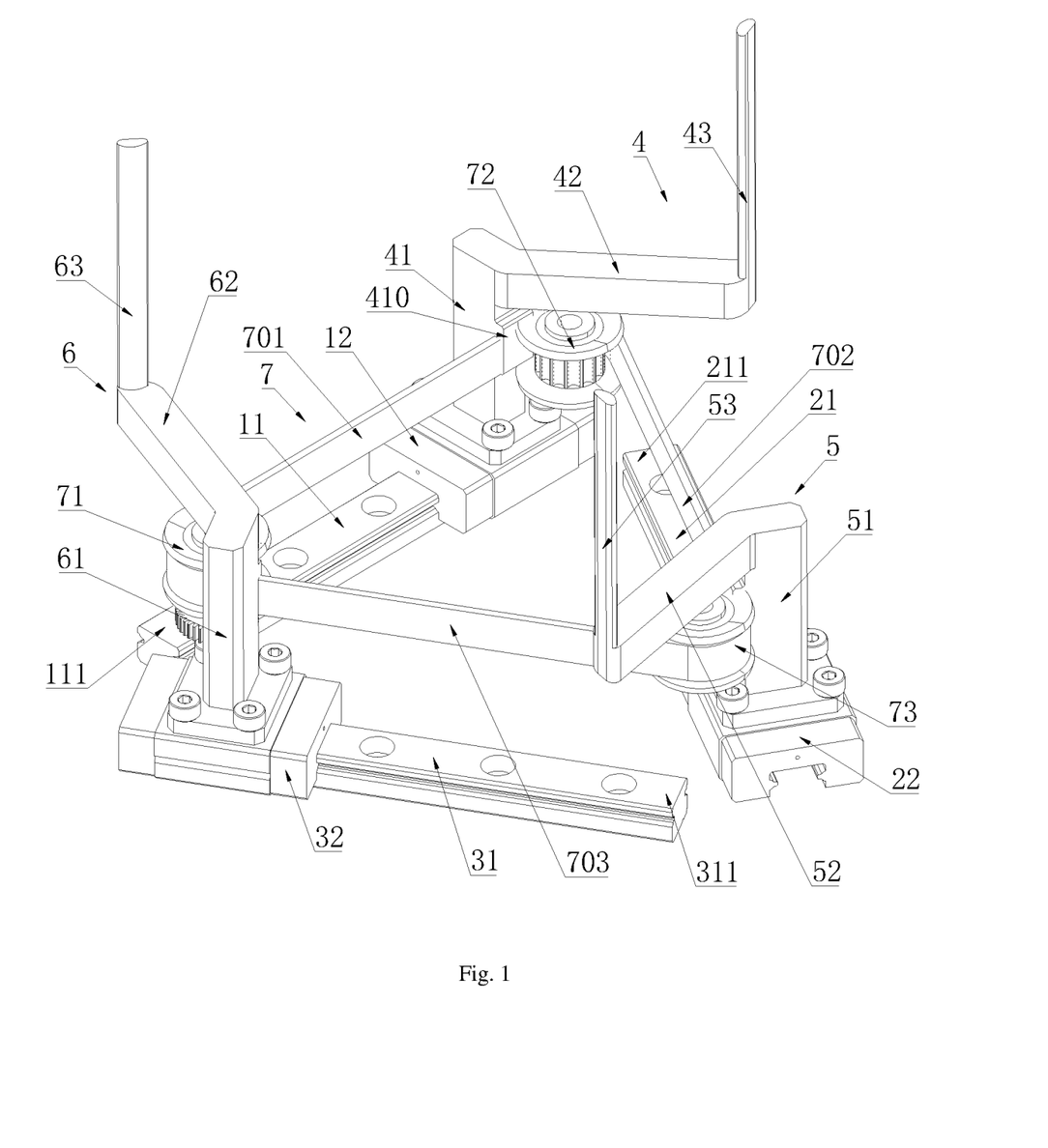
FIG. 1 is a perspective schematic view of a gripper according to an embodiment of the present disclosure, in which the gripper is in an open state.
Figure 3:
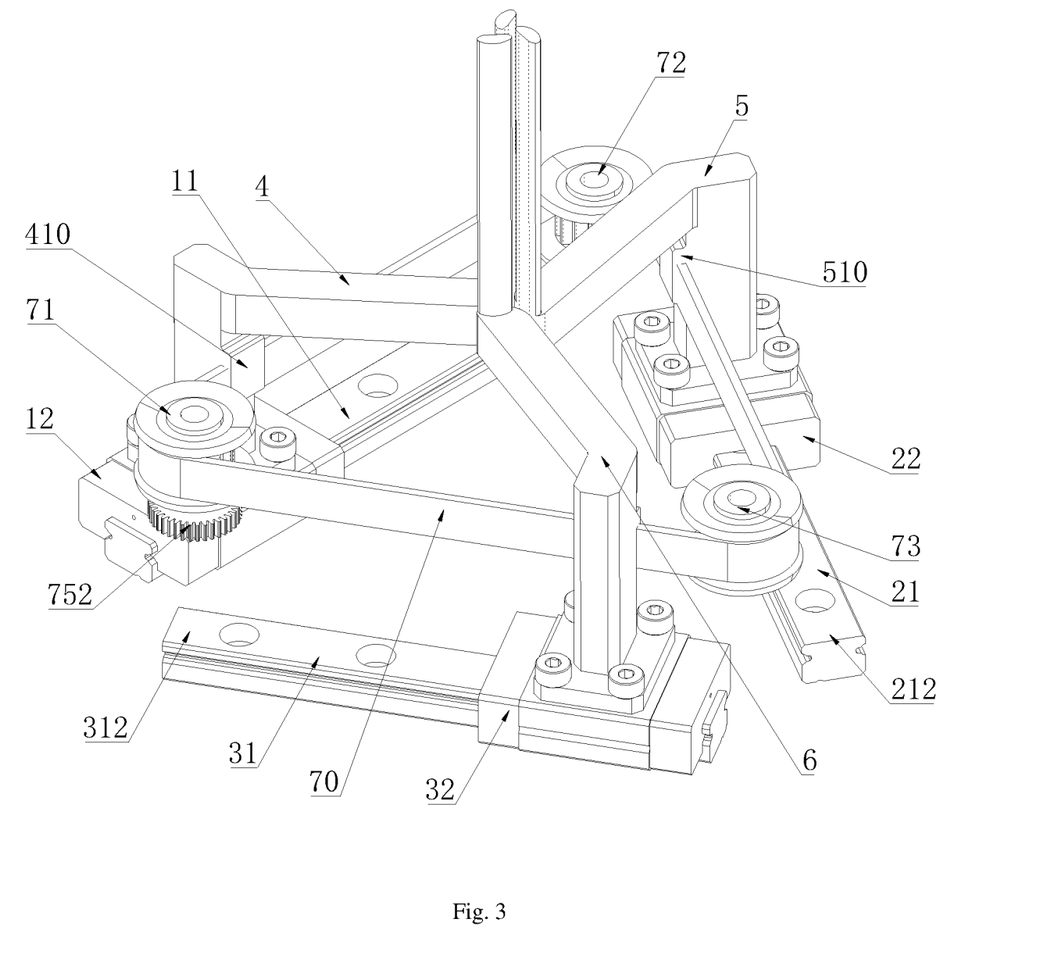
FIG. 3 is a perspective schematic view of a gripper according to an embodiment of the present disclosure, in which the gripper is in a closed state.

The three gripping fingers may include the first gripping finger 4, the second gripping finger 5, and the third gripping finger 6. A first end of the first gripping finger 4 is slidably connected to the first guiding rail 11, a first end of the second gripping finger 5 is slidably connected to the second guiding rail 21, and a first end of the third gripping finger 6 is slidably connected to the third guiding rail 31. In this embodiment, when the first ends of the first gripping finger 4, the second gripping finger 5, and the third gripping finger 6 are located at the second ends of the corresponding guiding rails 11, 21, 31 respectively, the second ends of the gripping fingers 4, 5, 6 are far away from the gripping center of the gripper, and the gripper is in an open state, as shown in FIG. 1. Conversely, when the first ends of the first gripping finger 4, the second gripping finger 5, and the third gripping finger 6 are located at the first ends of the corresponding guiding rails 11, 21, 31 respectively, the second ends of the gripping fingers 4, 5, 6 gather at the gripping center of the gripper, and the gripper is in a closed state, as shown in FIG. 3.

In some embodiments, the driving mechanism 7 can include a guiding belt 70, a first guiding pulley 71, a second guiding pulley 72, a third guiding pulley 73, and a power source. The guiding belt 70 can be fixedly connected to each of the gripping fingers respectively. For example, a fastening portion 410 of the first gripping finger 4 is connected to the guiding belt 70, a fastening portion 510 of the second gripping finger 5 is connected to the guiding belt 70, and a fastening portion (not shown) of the third gripping finger 6 is connected to the guiding belt 70.

Figure 4:
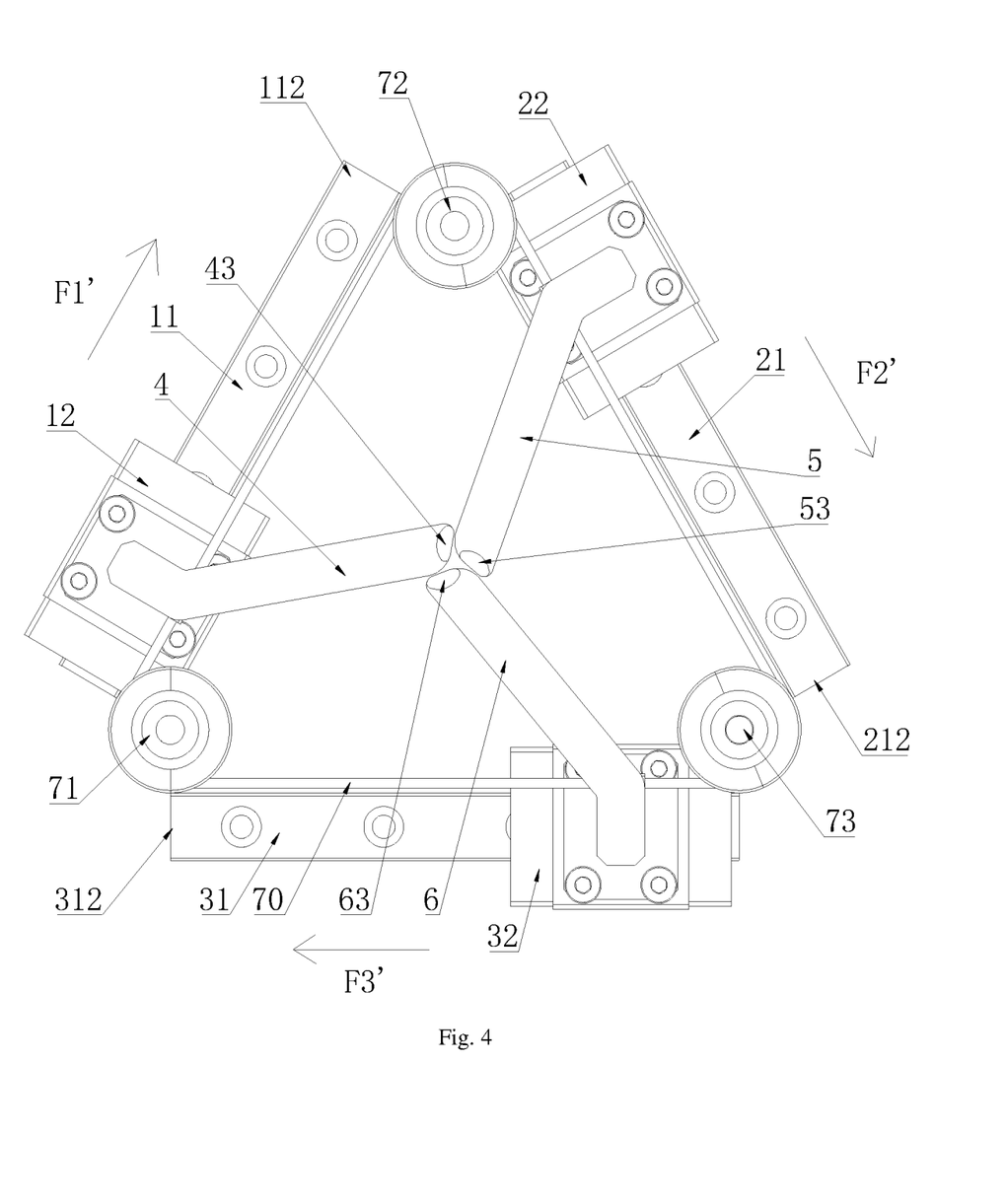
FIG. 4 is a top view of the gripper shown in FIG. 3.
Figure 5:
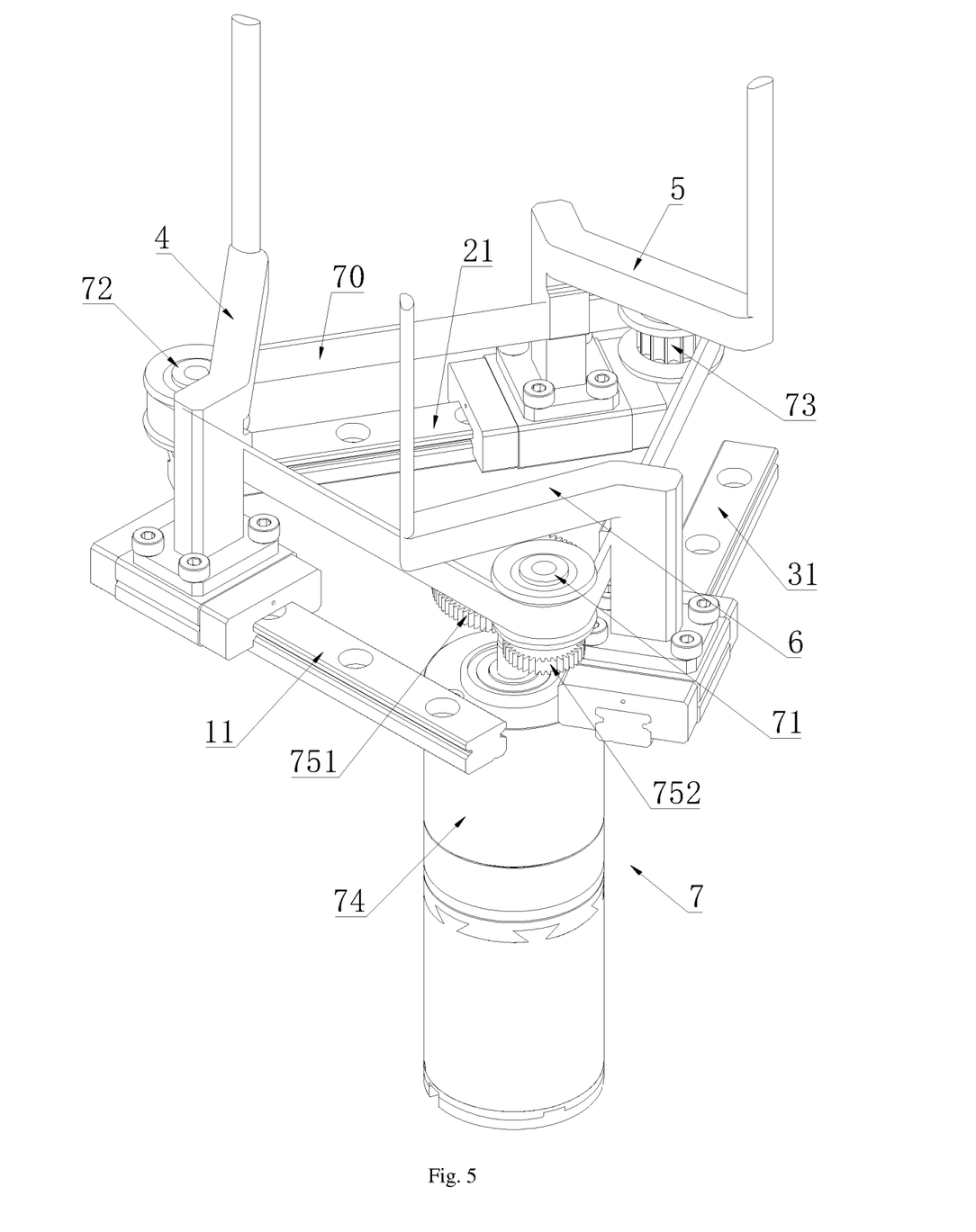
FIG. 5 is a perspective schematic view of a gripper according to an embodiment of the present disclosure.

The three guiding pulleys can be disposed respectively corresponding to the at least three guiding rails and can be respectively sleeved inside the guiding belt 70, so that each side of a triangle formed by connecting center points of the guiding pulleys can be parallel to a corresponding side of the virtual first regular triangle ABC defined by the three guiding rails. Referring to FIGS. 3-4, in this embodiment, the center points of the guiding pulleys 71, 72, 73 together with lines connecting them form a virtual second regular triangle (not shown). The three sides of the virtual second regular triangle are substantially parallel to the three sides of the virtual first regular triangle ABC, respectively. Meanwhile, the guiding belt 70 also forms a shape similar to a regular triangle. As shown in FIG. 1, for example, in the open state of the gripper, the guiding belt 70 are divided into three sub-guiding belts 701, 702, and 703, each of which respectively extends parallel to the corresponding one of the three guiding rails and is connected to a corresponding one of the three gripping fingers. In this way, the guiding belt 70 can pull each of the gripping fingers 4, 5 and 6 to move with less labor when the guiding belt 70 is rotating. It can be understood that, because the guiding belt 70 is rotatable, the constituent portion of each of the sub-guiding belt 701, 702, and 703 is changeable. In other embodiments, in order to ensure the tension of the guiding belt 70, several tension pulleys may be provided, and the guiding belt 70 is sleeved on each of the tension pulleys.

The power source is used for driving at least one guiding pulley to rotate. The rotation of the guiding pulley can drive the guiding belt 70 to rotate. The guiding belt 70 can drive each of the gripping fingers 4, 5 and 6 connected to each of the sub-guiding belt 701, 702 and 703 to move synchronously along the corresponding guiding rail when the guiding belt 70 is rotating. The guiding belt 70 may be made of, for example, a belt, a chain, or a wire rope. The power source may include a motor 74 and a reduction gear set connected to each other. The reduction gear set includes, for example, a first gear 751 and a second gear 752 that mesh with each other, of which the first gear 751 is disposed on an output shaft of the motor 74, and the second gear 752 is disposed on a center shaft of the first guiding pulley 71. In this way, the torque output by the motor 74 can be transmitted to the first guiding pulley 71 through the reduction gear set. The first guiding pulley 71 drives the guiding belt 70 to rotate, and the guiding belt 70 can drive each of the gripping fingers to move synchronously along the corresponding guiding rail. In some embodiments, each of the guiding pulleys may be respectively connected to a power source. In some embodiments, the reduction gear set can also have other implementations.

It should be noted that, in some embodiments, the driving mechanism can also have other implementations, as long as the gripping fingers can move synchronously or asynchronously along the corresponding guiding rails to realize the closing and opening actions of the gripper. For example, in some embodiments, the driving mechanism may include several telescopic cylinders for driving each of the gripping fingers to move linearly. In other embodiments, the driving mechanism may include several motors and several transmission mechanisms, and each of the transmission mechanisms is connected between a corresponding one of the motors and a corresponding one of the gripping fingers, in order to convert the rotation of the corresponding one of the motors into the linear movement of the corresponding one of the gripping fingers along the corresponding guiding rail. The transmission mechanism may be, for example, a rack and pinion mechanism or a worm gear mechanism or the like.

This embodiment further optimize the structure of each of the gripping fingers, and the structures of the gripping fingers may be the same. Specifically, the first gripping finger 4 may include a first column portion 41, a first lateral extension portion 42, and a first gripping portion 43 that are connected in sequence. A first end of the first column portion 41 forms the first end of the first gripping finger 4 and is connected to a first slider 12, and the first slider 12 is slidably connected to the first guiding rail 11. A first end of the first lateral extension portion 42 is connected to a second end of the first column portion 41, and the first gripping portion 43 is connected to a second end of the first lateral extension portion 42. The first gripping portion 43 forms the second end of the first gripping finger 4. Similarly, the second gripping finger 5 may include a second column portion 51, a second lateral extension portion 52, and a second gripping portion 53 that are connected in sequence. A first end of the second column portion 51 forms the first end of the second gripping finger 5 and is connected to the second slider 22, and the second slider 22 is slidably connected to the second guiding rail 21. A first end of the second lateral extension portion 52 is connected to a second end of the second column portion 51, and the second gripping portion 53 is connected to a second end of the second lateral extension portion 52. The second gripping portion 53 forms the second end of the second gripping finger 5. The third gripping finger 6 may include a third column portion 61, a third lateral extension portion 62, and a third gripping portion 63 that are connected in sequence. A first end of the third column portion 61 forms the first end of the third gripping finger 6 and is connected to a third slider 32, and the third slider 32 is slidably connected to the third guiding rail 31. A first end of the third lateral extension portion 62 is connected to a second end of the third column portion 61, and the third gripping portion 63 is connected to a second end of the third lateral extension portion 62. The third gripping portion 63 forms the second end of the third gripping finger 6. In one example, the guiding belt 70 is suitable for connecting with the column portion of each of the gripping fingers.

Figure 2:
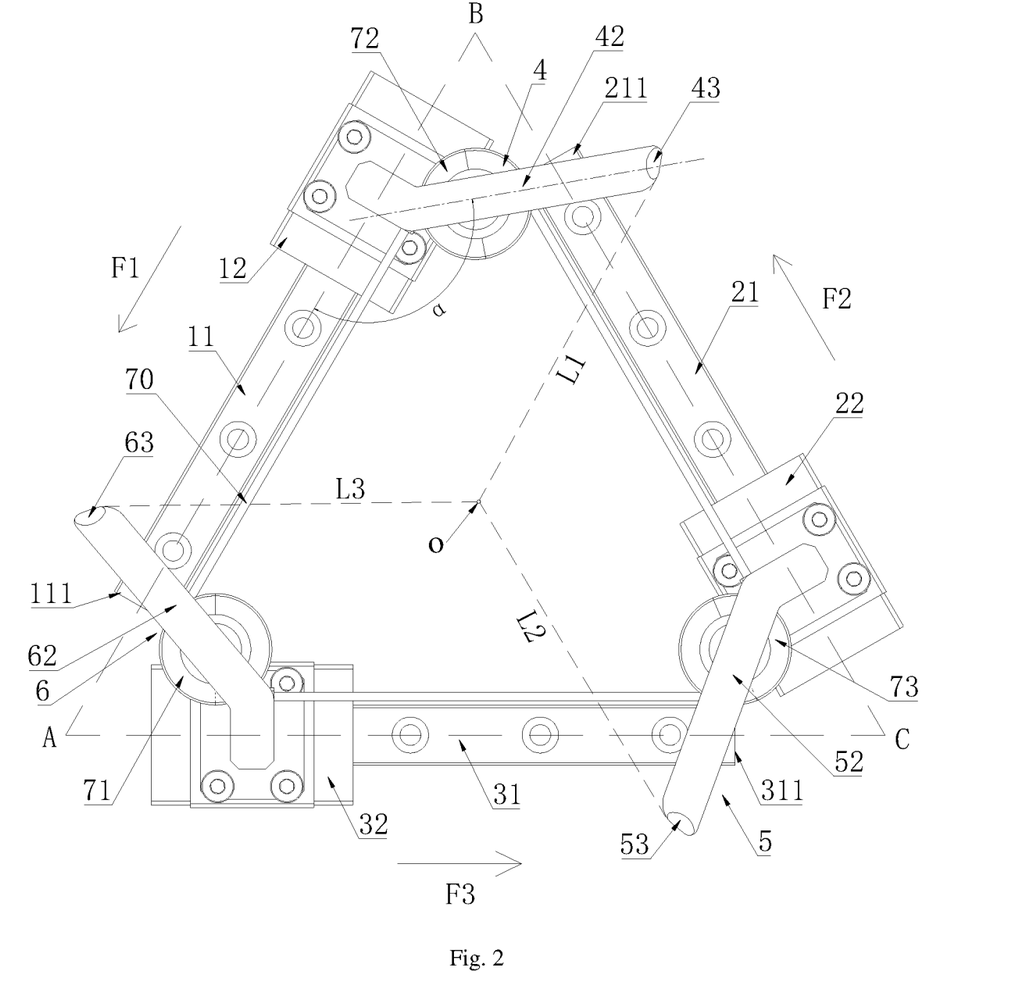
FIG. 2 is a top view of the gripper shown in FIG. 1.

In FIG. 2, it can be seen that the first lateral extension portion 42 is inclined relative to the first guiding rail 11, and the gripping center (corresponding to the center O of the first regular triangle ABC in this embodiment) is located within an obtuse angle range (the range of angle α as shown) defined by the first lateral extension portion 42 and the first guiding rail 11. In a similar way, the second lateral extension portion 52 is inclined relative to the second guiding rail 21, and the gripping center is located within an obtuse angle range defined by the second lateral extension portion 52 and the second guiding rail 21. The third lateral extension portion 62 is inclined relative to the third guiding rail 31, and the gripping center is located within an obtuse angle range defined by the third lateral extension portion 62 and the third guiding rail 31. By controlling the inclination angle of each lateral extension 42 relative to the corresponding guiding rail, the travel distance of each of the gripping fingers between the open state and the closed state of the gripper can be changed, which facilitates to increase the range of the travel distance of each of the gripping fingers as well as the stroke of the gripper.

Specifically, referring to FIG. 2, in this embodiment, the first gripping portion 43 can move a length L1 to reach the gripping center, and its travel distance is equal to the length L1. The second gripping portion 53 can move a length L2 to reach the gripping center, and its travel distance is equal to the length L2. The third gripping portion 63 can move a length L3 to reach the gripping center, and its travel distance is equal to the length L3. In an embodiment, L1=L2=L3. In contrast, if each lateral extension portion is not inclined relative to the corresponding guiding rail in the above-mentioned manner, for example, in some embodiments, each lateral extension portion is, for example, perpendicular to the corresponding guiding rail, then each of travel distances of the first gripping portion 43, the second gripping portion 53, and the third gripping portion 63 to the gripping center is obviously smaller than the aforementioned L1, L2, and L3, and thus the gripping range provided by the gripper is relatively small.

The gripping portion of each of the gripping fingers described above may all have a certain length. In some embodiments, a length direction of the gripping portion is substantially parallel to a length direction of the column portion. In some embodiments, the gripping portion and the column portion extend in opposite directions relative to the lateral extension portion.

The working process of the gripper provided in this embodiment will be described below with reference to FIGS. 1-5.

Referring to FIGS. 1 and 2, when the gripper is in the open state, the first end of each of the gripping fingers reaches the second end of the corresponding guiding rail. Meanwhile, the gripping portions of the gripping fingers are separated from each other and away from the gripping center. When the power mechanism 7 is activated, the guiding belt 70 rotates in a first direction and drives the first gripping finger 4 to move in a direction F1, the second gripping finger 5 to move in a direction F2, and the third gripping finger to move in a direction F3 synchronously.

Referring to FIGS. 3 and 4, the first end of each of the gripping fingers is driven by the guiding belt 70 to move to the first end of the corresponding guiding rail. Meanwhile, the gripping portions of the gripping fingers are at the gripping center located at the center line of the virtual first regular triangle ABC, and the gripper is in the closed state. When the power mechanism 7 is activated, the guiding belt 70 starts to rotate in a second direction opposite to the first direction and drives the first gripping finger 4 to move in a direction F1', the second gripping finger 5 to move in a direction F2', and the third gripping finger 6 to move in a direction F3'. The three gripping fingers 4, 5, 6 move synchronously and separate from each other, so that the gripper can be returned to the open state.

In some embodiments, the lateral extension portion of each of the gripping finger can rotate relative to its column portion, and the gripping portion of each of the gripping fingers can rotate relative to its lateral extension portion. In some embodiments, a length of the lateral extension portion of each of the gripping fingers is adjustable, and a length of each gripping portion is adjustable. For example, each lateral extension portion and each gripping portion may be telescopic arms. In this way, the posture of each of the gripping fingers and the gripping range of the gripper can be easily adjusted.

In the gripper provided in this embodiment, for example, when the three guiding rails are mounted on a fixing disc, the three guiding rails are arranged head to tail in sequence to define a regular triangle instead of being radially arranged. In this way, a length of each of the guiding rails can be significantly increased in a limited space, so as to increase a travel distance of each of the gripping fingers and a gripping size range of the gripper, thereby maximizing the use of space and improving the versatility of the gripper. In some embodiments, the travel distance of each of the gripping fingers may even be greater than or equal to the radius of the fixing disc.

It should be noted that although a three-jaw gripper including three gripping fingers is taken as an example of the gripper in this embodiment, it can be understood that in other embodiments, the gripper may also be a four-jaw gripper including four guiding rails and four gripping fingers or a multi-jaw gripper including several guiding rails and several gripping fingers, and the guiding rails thereof can be arranged head to tail in sequence. For example, each of the guiding rails can be located at each side of a virtual regular polygon. For example, the four guiding rails of the four-jaw gripper are respectively located at four sides of a virtual square, and similarly, five guiding rails of a five-jaw gripper are respectively located at five sides of a virtual regular pentagon. The guiding rails of these gripper can provide greater travel distances. Each of the guiding rails may be a linear guiding rail or a curved guiding rail, which are all within the protection scope of the present disclosure.

It can be understood that, regardless of the above-mentioned four-jaw gripper or the multi-jaw gripper, a driving mechanism similar to that of the three-jaw gripper provided in the embodiment of the present disclosure can be adopted. That is, the guiding belt is connected to each of the gripping fingers, several guiding pulleys are sleeved inside the guiding belt, and each side of the geometric shape formed by connecting center points of each of the guiding pulleys can be parallel to each side of a virtual regular polygon formed by the plurality of guiding rails. The power source drives at least one guiding pulley to rotate, and the guiding belt can drive each of the gripping fingers to move synchronously when the guiding belt is driven by the guiding pulley.

In other embodiments of the present disclosure, the gripper may also include other mounting and fixing components for mounting various guiding rails, driving mechanism and other parts. For example, each of the guiding rails may be mounted on a fixing disc which is not shown here, and the fixing disc for example can be mounted on an end of a robot, so that the gripper for example serves as an end effector of the robot.

In the gripper of the present disclosure, the at least three guiding rails can be arranged head to tail in sequence instead of being radially arranged. In this way, a length of each of the guiding rails can be significantly increased in a limited space, so as to increase a travel distance of each of the gripping fingers and a gripping size range of the gripper, thereby maximizing the use of space and improving the versatility of the gripper.

In an embodiment of the present disclosure, a robot equipped with the above-mentioned gripper is provided. Since the gripper of the present disclosure can achieve the above technical effects, the robot equipped with the gripper can also achieve corresponding technical effects, which will not be described in detail herein.

The above-mentioned embodiments only describe a few implementations of the present disclosure, and the description is relatively specific and detailed, but they should not be interpreted as a limitation on the scope of the patent disclosure.

It should be pointed out that for those skilled in the art, without departing from the concept of the present disclosure, several modifications and improvements can be made, and these all fall within the protection scope of the present disclosure. Therefore, the protection scope of the present disclosure shall be subject to the appended claims.

What is claimed is:

1. A gripper, comprising:
at least three guiding rails arranged head to tail in sequence;
at least three gripping fingers respectively disposed on the at least three guiding rails, each of the gripping fingers comprising a first end slidably connected to a corresponding one of the at least three guiding rails and a second end configured to contact an object to be gripped; and
a driving mechanism configured to drive each of the gripping fingers to move along the corresponding one of the at least three guiding rails, so that the second end of each of the gripping fingers moves toward or away from a gripping center of the gripper;
wherein each of the gripping fingers includes a column portion, a lateral extension portion, and a gripping portion that are connected in sequence, wherein a first end of the column portion forms the first end of each of the gripping fingers and is slidably connected to the corresponding one of the at least three guiding rails through a slider, the lateral extension portion comprising a first end connected to a second end of the column portion and a second end connected to the gripping portion, and the gripping portion forms the second end of each of the gripping fingers; and
wherein the lateral extension portion is inclined relative to the corresponding one of the at least three guiding rails, and the lateral extension portion and the corresponding one of the at least three guiding rails define an obtuse angle range within which the gripping center is located.

2. The gripper according to claim 1, wherein the driving mechanism comprises:
at least three guiding pulleys disposed respectively corresponding to the at least three guiding rails,
a guiding belt sleeved on the at least three guiding pulleys and divided into at least three sub-guiding belts respectively extending parallel to the corresponding one of the at least three guiding rails, wherein each of the sub-guiding belts is fixedly connected to the gripping finger on the corresponding one of the at least three guiding rails, and
a power source configured to drive at least one of the at least three guiding pulleys to rotate, and the rotation of the at least one of the at least three guiding pulleys being capable of driving the guiding belt to move, thereby driving the gripping fingers connected to the at least three sub-guiding belts to move along the corresponding guiding rails.

3. The gripper according to claim 2, wherein the guiding belt comprises a belt, a chain or a wire rope.

4. The gripper according to claim 1, wherein the gripping portion extends parallel to the column portion.

5. The gripper according to claim 4, wherein at least one of a length of the lateral extension portion and a length of the gripping portion is adjustable, and the lateral extension portion is rotatable relative to the column portion.

6. The gripper according to claim 1, wherein the driving mechanism comprises at least three motors and at least three transmission mechanisms, and each of the at least three transmission mechanisms is connected between a corresponding one of the at least three motors and a corresponding one of the at least three gripping fingers and configured to convert a rotation of the motor into a linear movement of the gripping finger along the corresponding one of the at least three guiding rails.

7. The gripper according to claim 1, wherein the at least three guiding rails cooperatively define a virtual regular polygon, and each of the at least three guiding rails is respectively located at each side of the virtual regular polygon.

8. A robot comprising a gripper, the gripper comprising:
at least three guiding rails arranged head to tail in sequence;
at least three gripping fingers respectively disposed on the at least three guiding rails, each of the gripping fingers comprising a first end slidably connected to a corresponding one of the at least three guiding rails and a second end configured to contact an object to be gripped; and
a driving mechanism configured to drive each of the gripping fingers to move along the corresponding one of the at least three guiding rails, so that the second end of each of the gripping fingers moves toward or away from a gripping center of the gripper;

wherein each of the gripping fingers includes a column portion, a lateral extension portion, and a gripping portion that are connected in sequence, wherein a first end of the column portion forms the first end of each of the gripping fingers and is slidably connected to the corresponding one of the at least three guiding rails through a slider, the lateral extension portion comprising a first end connected to a second end of the column portion and a second end connected to the gripping portion, and the gripping portion forms the second end of each of the gripping fingers; and wherein the lateral extension portion is inclined relative to the corresponding one of the at least three guiding rails, and the lateral extension portion and the corresponding one of the at least three guiding rails define an obtuse angle range within which the gripping center is located.

9. The robot according to claim 8, wherein the driving mechanism comprises:
   at least three guiding pulleys disposed respectively corresponding to the at least three guiding rails,
   a guiding belt sleeved on the at least three guiding pulleys and divided into at least three sub-guiding belts respectively extending parallel to the corresponding one of the at least three guiding rails, wherein each of the sub-guiding belts is fixedly connected to the gripping finger on the corresponding one of the at least three guiding rails, and
   a power source configured to drive at least one of the at least three guiding pulleys to rotate, and the rotation of the at least one of the at least three guiding pulleys being capable of driving the guiding belt to move, thereby driving the gripping fingers connected to the at least three sub-guiding belts to move along the corresponding guiding rails.

10. The robot according to claim 9, wherein, the guiding belt comprises a belt, a chain or a wire rope.

11. The robot according to claim 8, wherein the gripping portion extends parallel to the column portion.

12. The robot according to claim 11, wherein at least one of a length of the lateral extension portion and a length of the gripping portion is adjustable, and the lateral extension portion is rotatable relative to the column portion.

13. The robot according to claim 8, wherein the driving mechanism comprises at least three motors and at least three transmission mechanisms, and each of the at least three transmission mechanisms is connected between a corresponding one of the at least three motors and a corresponding one of the at least three gripping fingers and configured to convert a rotation of the motor into a linear movement of the gripping finger along the corresponding one of the at least three guiding rails.

14. The robot according to claim 8, wherein the at least three guiding rails cooperatively define a virtual regular polygon, and each of the at least three guiding rails is respectively located at each side of the virtual regular polygon.

* * * * *